United States Patent
Wu et al.

(10) Patent No.: US 11,460,943 B2
(45) Date of Patent: Oct. 4, 2022

(54) TOUCH CONTROL METHODS AND ELECTRONIC DEVICE

(71) Applicant: Beijing Xiaomi Mobile Software Co., Ltd., Beijing (CN)

(72) Inventors: Tsangchih Wu, Beijing (CN); Chihjen Cheng, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/100,034

(22) Filed: Nov. 20, 2020

(65) Prior Publication Data

US 2021/0405804 A1 Dec. 30, 2021

(30) Foreign Application Priority Data

Jun. 30, 2020 (CN) .......................... 202010621905.6

(51) Int. Cl.
*G06F 3/041* (2006.01)
(52) U.S. Cl.
CPC .................................. *G06F 3/0416* (2013.01)
(58) Field of Classification Search
None
See application file for complete search history.

(56) References Cited

U.S. PATENT DOCUMENTS

| | | | |
|---|---|---|---|
| 2011/0157064 A1 | 6/2011 | Imai | |
| 2016/0202839 A1* | 7/2016 | Hwang | G06F 3/04182 345/174 |
| 2019/0096358 A1* | 3/2019 | Zhao | G06T 1/20 |

FOREIGN PATENT DOCUMENTS

| | | |
|---|---|---|
| EP | 3454185 A1 | 3/2019 |
| JP | H08123618 A | 5/1996 |
| KR | 20130143412 A | 12/2013 |
| KR | 20200014591 A | 2/2020 |
| WO | WO 2019124908 A1 | 6/2019 |

OTHER PUBLICATIONS

Search Report dated Jun. 9, 2021, from the European Patent Office issued in counterpart European Application No. 20216399.4.
Office Action dated Jan. 14, 2022, from the Intellectual Property of India issued in counterpart Indian Application No. 202044057256.
Notification of Reason for Refusal for Korean Application No. 10-2020-0166415, dated May 17, 2022.

* cited by examiner

*Primary Examiner* — Stephen T. Reed
(74) *Attorney, Agent, or Firm* — Finnegan, Henderson, Farabow, Garrett & Dunner, L.L.P.

(57) ABSTRACT

A touch control method is applied to a touch drive module of a terminal device. The terminal device includes an application processor. The method includes: receiving a vertical synchronization signal; collecting position information corresponding to a touch operation; determining a reporting frequency of the position information based on the vertical synchronization signal, such that the position information is reported once in one signal interval, the signal interval being an interval between two adjacent vertical synchronization signals; and reporting the position information the application processor based on the reporting frequency.

18 Claims, 10 Drawing Sheets

TOUCH CONTROL METHODS AND ELECTRONIC DEVICE

CROSS REFERENCE TO RELATED APPLICATION

This application is based on and claims priority to Chinese Patent Application No. 202010621905.6, filed on Jun. 30, 2020, the entire content of which is hereby incorporated by reference.

FIELD

The present disclosure relates to the field of terminal devices, and more particularly, to touch control methods and an electronic device.

BACKGROUND

With development of science and technologies, response speed of terminal devices to operations of users is getting faster and faster, and response accuracy of terminal devices to operations of users is getting higher and higher. After a user performs a touch operation on a terminal device, a touch control component, such as a display screen, needs to collect position information corresponding to the touch operation of the user. The position information is reported to an application layer or a control layer in an application processor, such that the application layer or the control layer outputs a corresponding image based on the touch operation.

SUMMARY

According to a first aspect of embodiments of the present disclosure, a touch control method is applied to a touch drive module of a terminal device. The terminal device includes an application processor. The method includes: receiving a vertical synchronization signal; collecting position information corresponding to a touch operation; determining a reporting frequency of the position information based on the vertical synchronization signal, such that the position information is reported once in one signal interval, the signal interval being an interval between two adjacent vertical synchronization signals; and reporting the position information to the application processor based on the reporting frequency.

According to a second aspect of embodiments of the present disclosure, a touch control method is applied to an application processor of a terminal device. The terminal device includes a touch drive module. The method includes: sending a vertical synchronization signal to the touch drive module; and receiving position information reported by the touch drive module, wherein each piece of position information in the reported position information corresponds to one signal interval between two adjacent vertical synchronization signals.

According to a third aspect of embodiments of the present disclosure, an electronic device includes: a processor; and a memory storing instructions executable by the processor. The processor is configured: receive a vertical synchronization signal; collect position information corresponding to a touch operation; determine a reporting frequency of the position information based on the vertical synchronization signal, such that the position information is reported once in one signal interval, the signal interval being an interval between two adjacent vertical synchronization signals; and report the position information based on the reporting frequency.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only for the purpose of describing specific embodiments, and are not intended to limit the present disclosure. For example, the terms "first" and "second" may be used in the present disclosure to describe various types of information, the information should not be limited to these terms. These terms are only used to distinguish the same type of information from each other. For example, without departing from the scope of the present disclosure, first information may also be referred to as second information, and similarly, second information may also be referred to as first information.

In some embodiments, after position information corresponding to a touch operation is collected by a touch control component, the position information is first sent to a touch driver, and then sent up layer by layer. When touch data is generated, a microcontroller unit (MCU) at a hardware layer may send an interrupt (INT) signal to an upper layer, such that the upper layer may receive data such as coordinates of a touch through a communication interface of inter-integrated circuit (I2C) or serial peripheral interface (SPI). When the application layer is performing image output of a certain frame, touch firmware under the layer may be interrupted twice, and two coordinates are reported. Each of the interruptions may interrupt a program of a control hardware at the upper layer, and original work in progress may need to be transferred to a temporary memory space for storage, resulting in a first time of power consumption. After the interruption is completed, actions of transferring and storage performed on the original work in progress by the hardware, resulting in a second time of power consumption. During the above transferring, the hardware requires additional power consumption.

Figure 1:
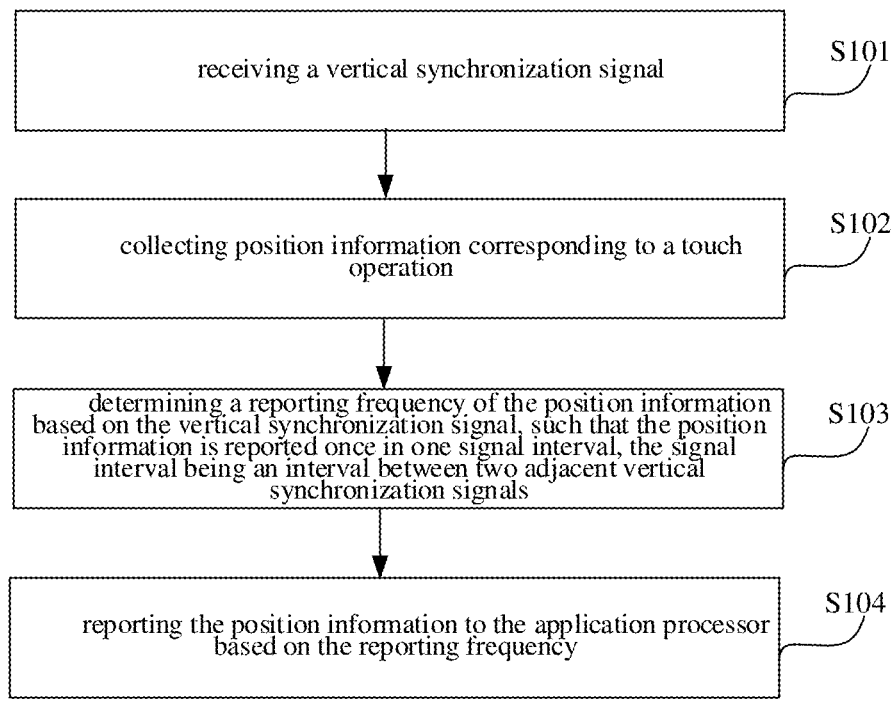
FIG. 1 is a flowchart of a touch control method applied to a touch drive module according to an exemplary embodiment.

To reduce power consumption, embodiments of the present disclosure provide touch control methods for a terminal device. FIG. 1 is a flow chart of a touch control method applied to a touch drive module of the terminal device according to an exemplary embodiment. The terminal device may also include an application processor and a display drive module. The terminal device may be a smart phone, a tablet computer, a desktop/laptop/handheld computer, a notebook computer, an ultra-mobile personal computer (UMPC), a netbook, a cellular phone, a personal digital assistant (PDA), an augmented reality (AR)/virtual reality (VR) device, and other devices including a touch screen, which is not limited in the present disclosure. The method includes blocks S101 to S104.

At block S101, a vertical synchronization signal is received.

The vertical synchronization signal is a synchronization signal between the application processor and the display drive module for displaying and refreshing frames. With the vertical synchronization signal, a refresh of a display screen driven by the display drive module and an update of a drawing image performed by the application processor may be performed synchronously. The application processor continuously sends vertical synchronization signals to the display drive module. After each vertical synchronization signal is sent to the display drive module, the application processor updates one frame of image, and the display drive module drives the display screen to refresh one frame of image.

In an embodiment, each time the application processor sends a vertical synchronization signal to the display drive module, the application processor simultaneously sends a vertical synchronization signal to the touch drive module. The specific sending form may be directly sending or indirectly sending. Therefore, the touch drive module receives the vertical synchronization signal, that is, a frequency and a specific time point of refreshing the image performed by both the application processor and the display drive module are notified to the touch drive module in real time, so that the touch drive module may make a report at a frequency and a time point matching the above frequency and time point.

At block S102, position information corresponding to a touch operation is collected.

The touch operation is inputted by a user based on the display screen of the terminal device, that is, the user may touch a certain position on the display screen, and positions of touching made by the user may change from time to time. The touch drive module scans sensors in the display screen in real time, so as to obtain the position information corresponding to the touch operation of the user. The position information may be represented by coordinates. For example, rows and columns of pixels of the display screen may be labeled. The position corresponding to the touch operation corresponds to one or more pixels. Coordinates of each pixel is represented by a row label and a column label of the pixel, the coordinates of the one or more pixels may be used to represent the position corresponding to the touch operation.

In some embodiments, the position information corresponding to the touch operation inputted by the user is collected based on a preset frequency. For example, the preset frequency may be 60 Hz, 90 Hz, 120 Hz, 180 Hz, or the like.

At block S103, a reporting frequency of the position information is determined based on the vertical synchronization signal, such that the position information is reported once in one signal interval. The signal interval is an interval between two adjacent vertical synchronization signals.

In an embodiment, one signal interval is the time period required for the application processor and the display drive module to refresh one frame of image. The frequency of refreshing the image and the frequency of collecting the position information may be the same or different. When the above two frequencies are the same, pieces of position information that may be reflected in refreshing each frame of image (in other words, pieces of position information referred to in drawing each frame of image) have the same value. When the above two frequencies are different, pieces of position information that may be reflected in refreshing each frame of image (in other words, pieces of position information referred to in drawing each frame of image) have different values.

In an embodiment, after the touch drive module collects the position information, the reporting frequency of the position information may be determined based on the vertical synchronization signal, that is, only one piece of position information is reported during a time period between two vertical synchronization signals. In this manner, regardless of whether the frequency of refreshing the image and the frequency of collecting the position information are the same, pieces of position information that may be reflected in refreshing each frame of image (in other words, pieces of position information referred to in drawing each frame of image) have the same value, so a slide is smoother. In addition, since only one piece of position information is reflected in refreshing each frame of image, the power consumption of the terminal device is reduced as the program of the control hardware in the upper layer is interrupted only once.

At block S104, the position information is reported to the application processor based on the reporting frequency.

In an embodiment, an interrupt signal is reported first. After receiving the interrupt signal, the application processor interrupts an ongoing program or task, and then receives the position information reported through the communication interface of I2C or SPI.

In embodiments of the present disclosure, the vertical synchronization signal sent by the application processor and/or the display drive module is received, such that a frequency at which the application processor and/or the display drive module updates an image, and a specific time of updating the image are obtained. For example, the time when each vertical synchronization signal is sent is the time when the image is updated. After the position information corresponding to the touch operation is collected, the position information is not reported directly, rather, the reporting frequency of the position information is determined based on the vertical synchronization signal, such that the reporting frequency of the position information matches the frequency of updating the image. That is to say, one piece of position information is reported each time an image is updated. And then, the position information is reported to the application processor based on the above frequency. By matching the reporting frequency of the position information with the vertical synchronization signal, the position information is reported once within one signal interval, such that a report rate is lowered, uniformity of reporting points is ensured, steps of suspending a task, receiving the position information, and restarting the task of the application processor are decreased, and the power consumption of the terminal device is reduced.

In some embodiments of the present disclosure, the reporting frequency of the position information may be determined in the following two manners.

In the first manner, position information for reporting in one signal interval is determined based on at least one piece of position information collected in the one signal interval.

In the second manner, position information for reporting in each of at least two signal intervals is determined based on at least two pieces of position information collected in the at least two signal intervals. At least one piece of position information is collected in each signal interval.

Regarding the first manner, after the position information in the one signal interval is collected, the position information for reporting in the interval is calculated. The position information collected or one piece of the position information collected may be directly reported. That is to say, in response to one piece of position information collected in the one signal interval, the position information is reported; and/or in response to at least two pieces of position information collected in the one signal interval, one of the at least two pieces of position information is reported. It is also possible to determine and report a new piece of position information based on the at least one piece of position information collected in the one signal interval.

Figure 2:
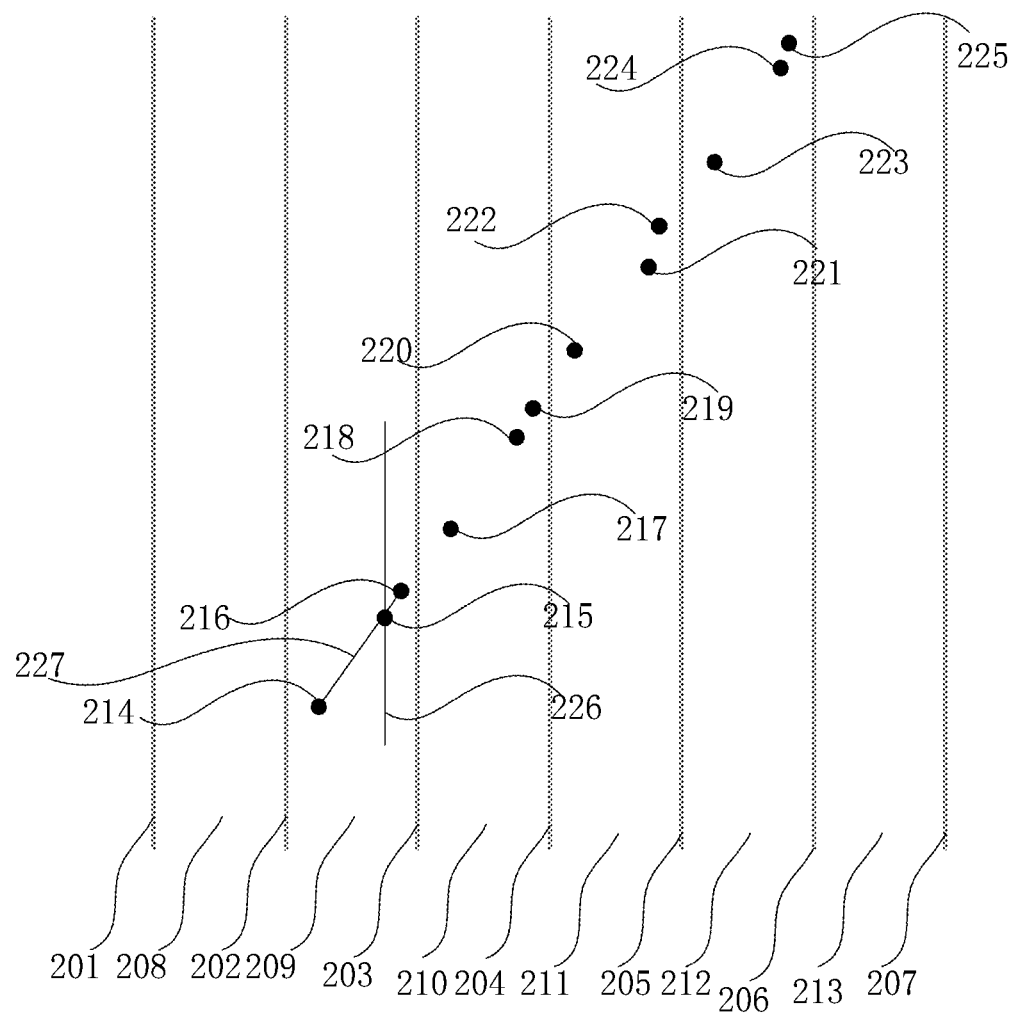
FIG. 2 is a schematic diagram of a manner of determining a reporting frequency of position information according to an exemplary embodiment.

FIG. 2 is a schematic diagram of a manner of determining a reporting frequency of position information according to an exemplary embodiment. Referring to FIG. 2, numerals 201-207 represent seven vertical synchronization signals, and numerals 208-213 represent six signal intervals formed by the above seven vertical synchronization signals. Two pieces of position information are collected in each of the signal intervals 209, 210, 211 and 212. For example, two pieces of position information 214 and 216 are collected in the signal interval 209; two pieces of position information 217 and 219 are collected in the signal interval 210; two pieces of position information 220 and 222 are collected in the signal interval 211; and two pieces of position information 223 and 225 are collected in the signal interval 212. For each of the above four signal intervals, a new piece of position information for reporting is determined based on the two pieces of position information collected therein. That is to say, within the signal interval 209, position information 215 is determined based on the position information 214 and 216 collected. Within the signal interval 210, position information 218 is determined based on the position information 217 and 219 collected. Within the signal interval 211, position information 221 is determined based on the position information 220 and 222 collected.

Within the signal interval 212, position information 224 is determined based on the position information 223 and 225 collected Manners of determining the new piece of position information for reporting for the above four signal intervals are the same. The following description takes the signal interval 209 as an example. In the signal interval 209, a reporting time line 226 is preset. The two pieces of position information 214 and 216 collected in the signal interval 209 are connected to form a connection line 227. An intersection of the connection line 227 and the reporting time line 226 is determined as the new piece of position information 215 for reporting. New pieces of position information are determined in the same manner for other signal intervals. Reporting time lines and connection lines of other intervals are similar and are not shown in FIG. 2.

In embodiments of the present disclosure, the above-mentioned first manner of determining the position information for reporting is a one-to-one correspondence determination manner. In addition, determining the position information immediately after collecting the position information reduces time lag and delay time of reporting the position information, and improves the instantaneity and efficiency of reporting.

In the second manner, after the position information in the at least two signal intervals are collected, at least two pieces of position information are collected as at least one piece of position information is collected in each signal interval. For each interval, the position information for reporting is calculated based on the at least two pieces of position information collected.

Figure 3:
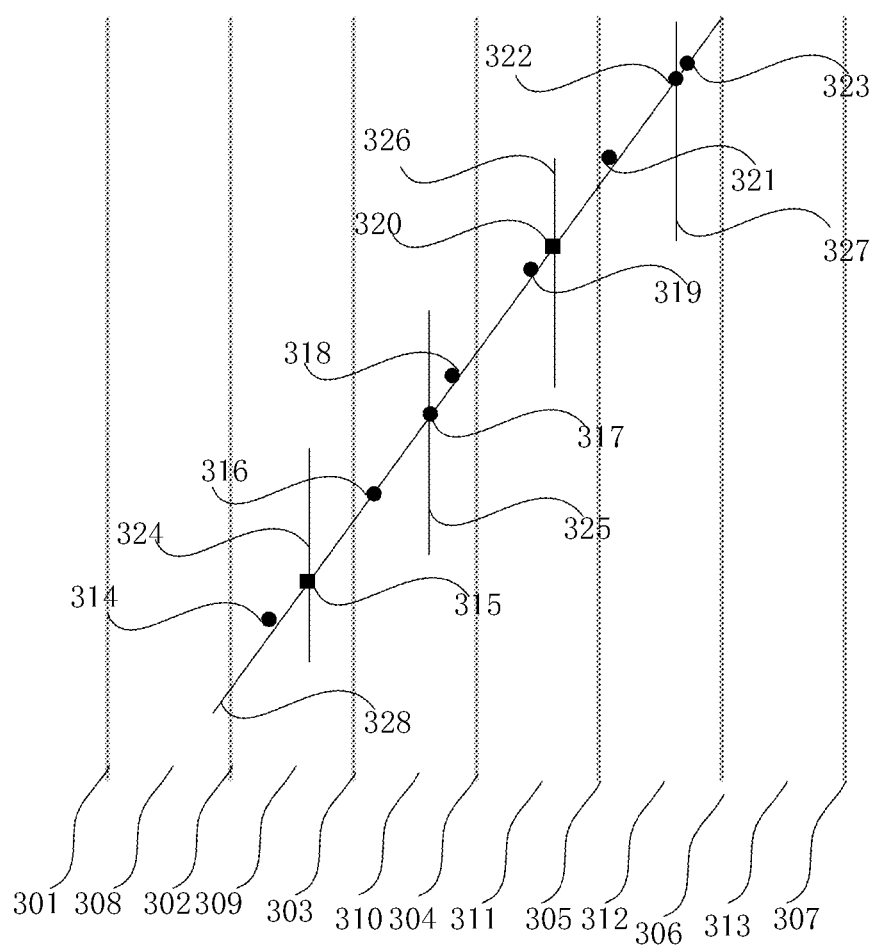
FIG. 3 is a schematic diagram of a manner of determining a reporting frequency of position information according to an exemplary embodiment.

FIG. 3 is a schematic diagram of a manner of determining a reporting frequency of position information according to an exemplary embodiment. Referring to FIG. 3, numerals 301-307 represent seven vertical synchronization signals, and numerals 308-313 represent six signal intervals formed by formed by the above seven vertical synchronization signals. One piece of position information 314 is collected in the signal interval 309. Two pieces of position information 316 and 318 are collected in the signal interval 310. One piece of position information 319 is collected in the signal interval 311. Two pieces of position information 321 and 323 are collected in the signal interval 312. The position information for reporting in each signal interval is determined based on the six pieces of position information collected in the above four signal intervals. In other words, it is determined that position information 315 is reported in the signal interval 309; it is determined that position information 317 is reported in the signal interval 310; it is determined that position information 320 is reported in the signal interval 311; and it is determined that position information 322 is reported in the signal interval 312. For example, a reporting time line is set in each signal interval. That is to say, a reporting time line 324 is set in the signal interval 309; a reporting time line 325 is set in the signal interval 310; a reporting time line 326 is set in the signal interval 311; and a reporting time line 327 is set in the signal interval 312. A connection line is determined based on all the position information collected in a manner of including as much position information as possible on the connection line (in a manner of minimizing a sum of distances from each piece of position information to the connection line). For example, a connection line 328 is determined based on the position information 314, 316, 318, 319, 321, and 323. An intersection of the connection line and each reporting time line is determined as the position information for reporting. That is to say, an intersection 315 of the connection line 328 and the reporting time line 324 is determined as the position information for reporting in the signal interval 309; an intersection 317 of the connection line 328 and the reporting time line 325 is determined as the position information for reporting in the signal interval 310; an intersection 320 of the connection line 328 and the reporting time line 326 is determined as the position information for reporting in the signal interval 311; and an intersection 322 of the connection line 328 and the reporting time line 327 is determined as the position information for reporting in the signal interval 312.

In embodiments of the present disclosure, the above-mentioned second manner of determining the position information for reporting is a many-to-many correspondence determination manner. The second manner fully considers mutual influence of the position information collected in adjacent signal intervals, and improves accuracy and smoothness of the position information for reporting.

Figure 4:
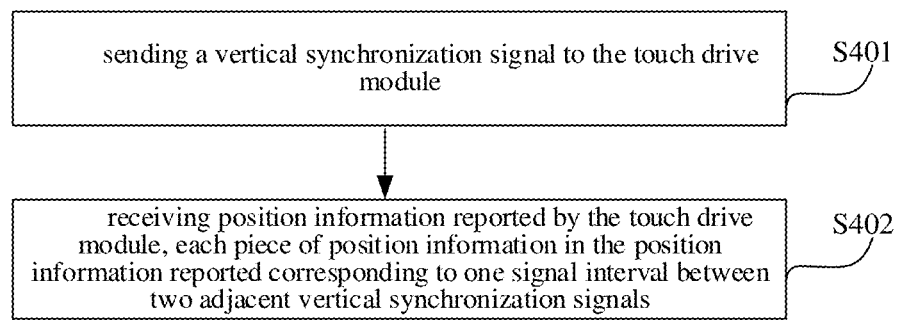
FIG. 4 is a flowchart of a touch control method applied to an application processor according to an exemplary embodiment.

FIG. 4 is a flow chart of a touch control method applied to an application processor of a terminal device according to an exemplary embodiment. The terminal device may also include an application processor and a display drive module. The terminal device may be a smart phone, a tablet computer, a desktop/laptop/handheld computer, a notebook computer, an ultra-mobile personal computer (UMPC), a netbook, a cellular phone, a personal digital assistant (PDA), an augmented reality (AR)/virtual reality (VR) device, and other devices including the touch screen, which is not limited in the present disclosure. The method includes steps S401 and S402.

At block S401, a vertical synchronization signal is sent to the touch drive module.

The vertical synchronization signal is a synchronization signal between the application processor and the display drive module for displaying and refreshing frames. With the vertical synchronization signal, a refresh of the display screen driven by the display drive module and an update of a drawing image performed by the application processor may be performed synchronously. The application processor may continuously send vertical synchronization signals to the display drive module. After each vertical synchronization signal is sent to the display drive module, the application processor updates one frame of image, and the display drive module drives the display to refresh one frame of image.

In an embodiment, each time the application processor sends a vertical synchronization signal to the display drive module, the application processor simultaneously sends a vertical synchronization signal to the touch drive module. The specific sending form may be directly sending or indirectly sending. Therefore, the touch drive module receives the vertical synchronization signal, that is, the frequency and specific time point of refreshing the image performed by both the application processor and the display drive module are notified to the touch drive module in real time, so that the touch drive module may make a report at a frequency and time point matching the above frequency and time point.

Figure 5:
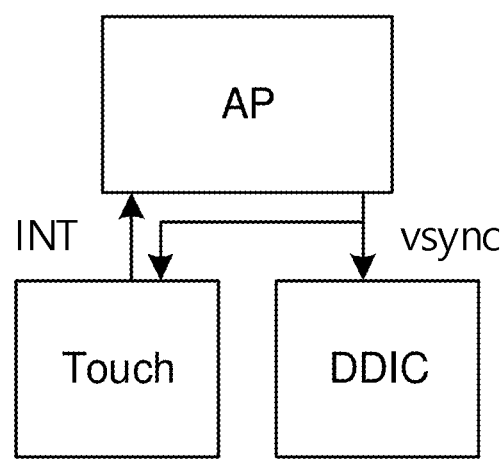
FIG. 5 is a schematic diagram illustrating directly sending a vertical synchronization signal to a touch drive module according to an exemplary embodiment.

FIG. 5 illustrates a manner in which the application processor directly sends the vertical synchronization signal to the touch drive module according to an exemplary embodiment. For example, the application processor AP sends the vertical synchronization signal vsync to the display drive module DDIC and the touch drive module Touch synchronously.

Figure 6:
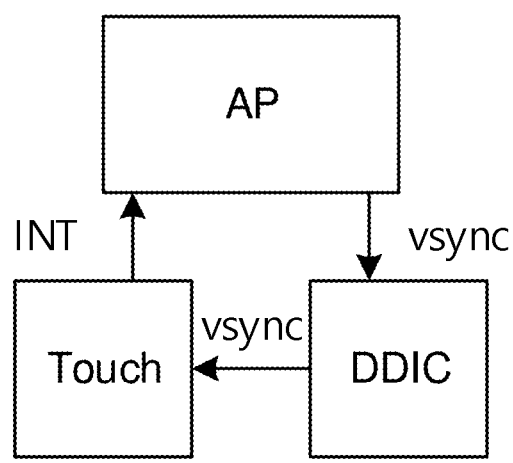
FIG. 6 is a schematic diagram illustrating indirectly sending a vertical synchronization signal to a touch drive module according to an exemplary embodiment.

FIG. 6 illustrates a manner in which the application processor indirectly sends the vertical synchronization signal to the touch drive module according to an exemplary embodiment. For example, the application processor AP sends the vertical synchronization signal vsync to the display drive module DDIC, and the display drive module DDIC sends the vertical synchronization signal vsync to the touch drive module Touch. In this manner, the display drive module DDIC and the touch drive module Touch may be integrated into a touch and display drive module TDDI.

Referring back to FIG. 4, at block S402, position information reported by the touch drive module is received. Each piece of position information in the position information reported corresponds to one signal interval between two adjacent vertical synchronization signals.

In an embodiment, the touch drive module collects position information corresponding to each touch operation in real time, determines the reporting frequency of the position information based on the vertical synchronization signal, and reports the position information based on the reporting frequency determined. For example, during reporting, an interrupt signal INT (FIGS. 5 and 6) needs to be reported first. After receiving the interrupt signal, the application processor suspends the ongoing program or task, and then receives the position information reported through the communication interface of I2C or SPI. Since the reporting frequency determined by the touch drive module is that the position information is reported once in one signal interval, each piece of position information received by the application processor corresponds to one signal interval.

In embodiments of the present disclosure, sending the vertical synchronization signal to the touch drive module enables the touch drive module to obtain a frequency at which the application processor and/or the display drive module updates an image, and a specific time point of updating the image. For example, the time point when each vertical synchronization signal is sent is the time point when the image is updated. The position information reported by the touch drive module at the reporting frequency determined is received, that is, one piece of position information is received every time one frame of image is refreshed, such that the report rate is lowered, the uniformity of reporting points is ensured, steps of suspending a task, receiving the position information, and restarting the task at the application processor are decreased, and the power consumption of the terminal device is reduced.

In some embodiments of the present disclosure, after the position information is received, the method further includes determining visible position information based on the position information for reporting and the vertical synchronization signal, such that time intervals between pieces of visible position information and adjacent vertical synchronization signals are equal.

The time intervals between the pieces of visible position information and the adjacent vertical synchronization signals being equal means that for each signal interval, the visible position information has identical time distance to the vertical synchronization signal on left side of the signal interval, and for each signal interval, the visible position information has identical time distance to the vertical synchronization signal on right side of the signal interval. By confirming the visible position information, a connection line of various pieces of position information or various reporting points is smooth, and thus the user experience of touching the touch screen of the terminal device is improved.

Figure 7:
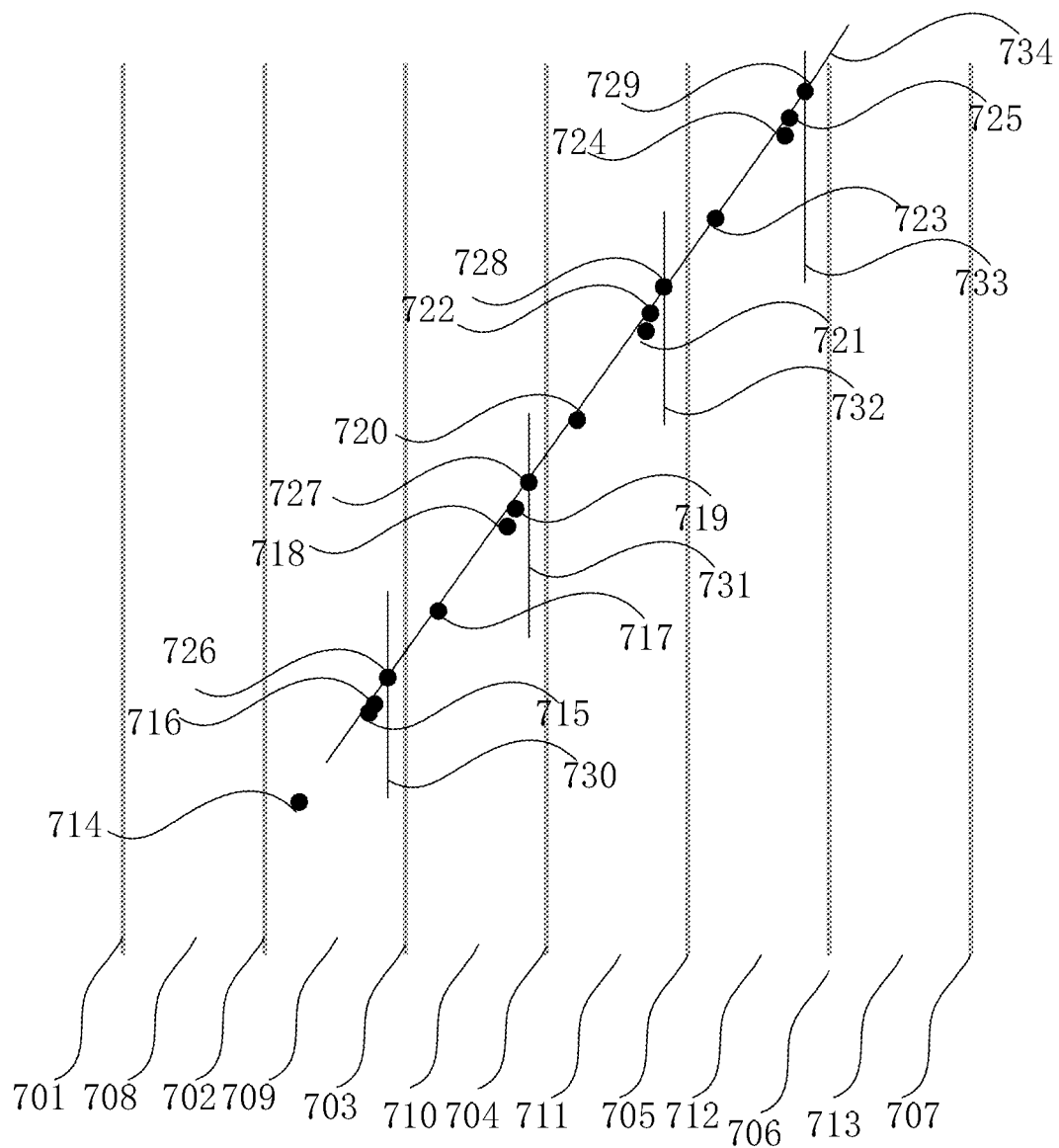
FIG. 7 is a schematic diagram illustrating determining visible position information according to an exemplary embodiment.

FIG. 7 is a schematic diagram illustrating determining visible position information according to an exemplary embodiment. Referring to FIG. 7, numerals 701-701 represent seven vertical synchronization signals, and numerals 708-713 represent six signal intervals formed by the above seven vertical synchronization signals. Two pieces of position information are collected in each of the signal intervals 709, 710, 711 and 712. That is, two pieces of position information 714 and 715 are collected in the signal interval 709; two pieces of position information 717 and 718 are collected in the signal interval 710; two pieces of position information 720 and 721 are collected in the signal interval 711; and two pieces of position information 723 and 724 are collected in the signal interval 712. Regarding each of the above four signal intervals, a new piece of position information for reporting is determined based on the two pieces of position information collected thereon. That is, in the signal interval 709, position information 716 is determined based on the position information 714 and 715 collected; in the signal interval 710, position information 719 is determined based on the position information 717 and 718 collected; in the signal interval 711, position information 722 is determined based on the position information 720 and 721 collected; and in the signal interval 712, position information 725 is determined based on the position information 723 and 724 collected. For each of the above four signal intervals, the visible position information is determined based on the position information for reporting and the vertical synchronization signal. That is to say, in the signal interval 709, visible position information 726 is determined based on the position information 716 for reporting; in the signal interval 710, visible position information 727 is determined based on the position information 719 for reporting; in the signal interval 711, visible position information 728 is determined based on the position information 722 for reporting; and in the signal interval 712, visible position information 729 is determined based on the position information 725 for reporting. A time distance from the visible position information 726 to a vertical synchronization signal 702 on a left side of the visible position information 726, a time distance from the visible position information 727 to a vertical synchronization signal 703 on a left side of the visible position information 727, a time distance from the visible position information 728 to a vertical synchronization signal 704 on a left side of the visible position information 728, and a time distance from the visible position information 729 to a vertical synchronization signal 705 on a left side of the visible position information 729 are identical. A time distance from the visible position information 726 to the vertical synchronization signal 703 on a right side of the visible position information 726, a time distance from the visible position information 727 to the vertical synchronization signal 704 on a right side of the visible position information 727, a time distance from the visible position information 728 to the vertical synchronization signal 705 on a right side of the visible position information 728, and a time distance from the visible position information 729 to a vertical synchronization signal 706 on a right side of the visible position information 729 are identical. The visible position information of each signal interval may be determined in the following manner. Various visible time lines in the signal intervals are preset uniformly. For example, a visible time line 730 in the signal interval 709, a visible time line 731 in the signal interval 710, a visible time line 732 in the signal interval 711, and a visible time line 733 in the signal interval 712 are preset uniformly. A connection line is determined based on all the position information for reporting in a manner of including as much position information as possible on a connection line (in a manner of minimizing a sum of distances from each piece of position information to the connection line). That is to say, a connection line 734 is determined based on the position information 716, 719, 722, and 723 for reporting. Intersections of the connection line and various visible time lines are determined as pieces of visible position information. That is to say, an intersection 726 of the connection line 734 and a visible time line 716 is determined as the visible position information in the signal interval 709; an intersection 727 of the connection line 734 and a visible time line 719 is determined as the visible position information in the signal interval 710; an intersection 728 of the connection line 734 and a visible time line 722 is determined as the visible position information in the signal interval 711; and an intersection 729 of the connection line 734 and a visible time line 725 is determined as the visible position information in the signal interval 712.

Figure 8:
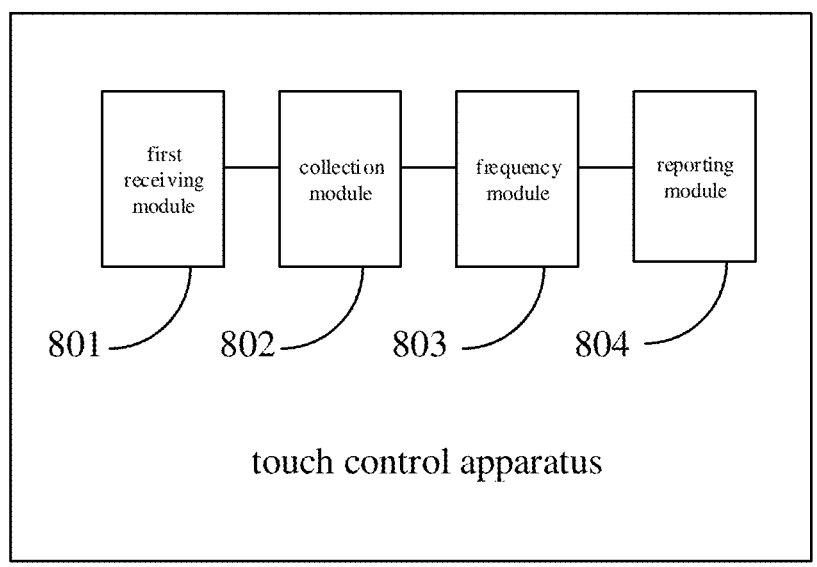
FIG. 8 is a schematic diagram of a touch control apparatus applied to a touch drive module according to an exemplary embodiment.

FIG. 8 is a schematic diagram of a touch control apparatus applied to a touch drive module of a terminal device, according to an exemplary embodiment. The terminal device also includes an application processor and a display drive module. The apparatus includes a first receiving module 801, a collection module 802, a frequency module 803 and a reporting module 804. The first receiving module 801 is configured to receive a vertical synchronization signal. The collection module 802 is configured to collect position information corresponding to a touch operation. The frequency module 803 is configured to determine a reporting frequency of the position information based on the vertical synchronization signal, such that the position information is reported once in one signal interval. The signal interval is an interval between two adjacent vertical synchronization signals. The reporting module 804 is configured to report the position information to the application processor based on the reporting frequency.

In some embodiments, the collection module 802 is configured to collect the position information corresponding to the touch operation inputted by a user based on a preset frequency.

In some embodiments, the frequency module 803 includes a first reporting unit and a second reporting unit. The first reporting unit is configured to determine position information for reporting in one signal interval based on at least one piece of position information collected in the one signal interval. The second reporting unit is configured to determine position information for reporting in each of at least two signal intervals based on at least two pieces of position information collected in the at least two signal intervals. At least one piece of position information is collected in each signal interval.

In some embodiments, the first reporting unit is configured to: in response to collecting one piece of position information in the one signal interval, report the position information; and in response to collecting at least two pieces of position information in the one signal interval, report one of the at least two pieces of position information.

In some embodiments, the first reporting unit is configured to determine a new piece of position information based on at least two pieces of position information collected in the one signal interval for reporting.

Regarding the apparatus according to the foregoing embodiments, the operation performed by each module of the apparatus has been described in detail in the method embodiments, and thus will not be repeated here.

Figure 9:
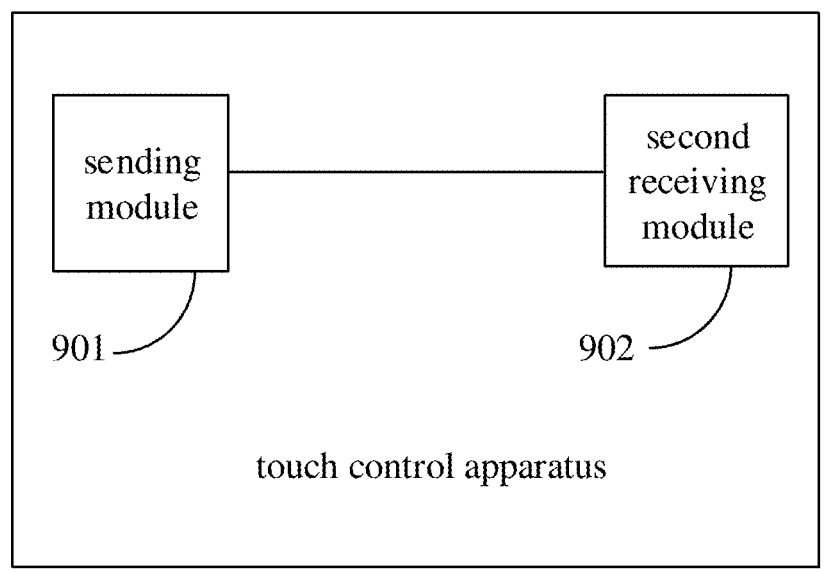
FIG. 9 is a schematic diagram of a touch control apparatus applied to an application processor according to an exemplary embodiment.

FIG. 9 is a schematic diagram of a touch control apparatus applied to an application processor of a terminal device, according to an exemplary embodiments. The terminal device also includes a touch drive module. The apparatus includes a sending module 901 and a second receiving module 902. The sending module 901 is configured to send a vertical synchronization signal to the touch drive module. The second receiving module 902 is configured to receive position information reported by the touch drive module. Each piece of position information in the position information reported corresponds to one signal interval between two adjacent vertical synchronization signals.

In some embodiments, the terminal device further includes a display drive module. The sending module is configured to send the vertical synchronization signal to the display drive module. The display module sends the vertical synchronization signal to the touch drive module.

In some embodiments, the apparatus further includes a visible module. The visible module is configured to determine visible position information based on the position information for reporting and the vertical synchronization signal, such that time intervals between pieces of visible position information and adjacent vertical synchronization signals are equal.

Regarding the apparatus according to the foregoing embodiments, the specific operation performed by each module of the apparatus has been described in detail in the method embodiments, and thus will not be repeated here.

Figure 10:
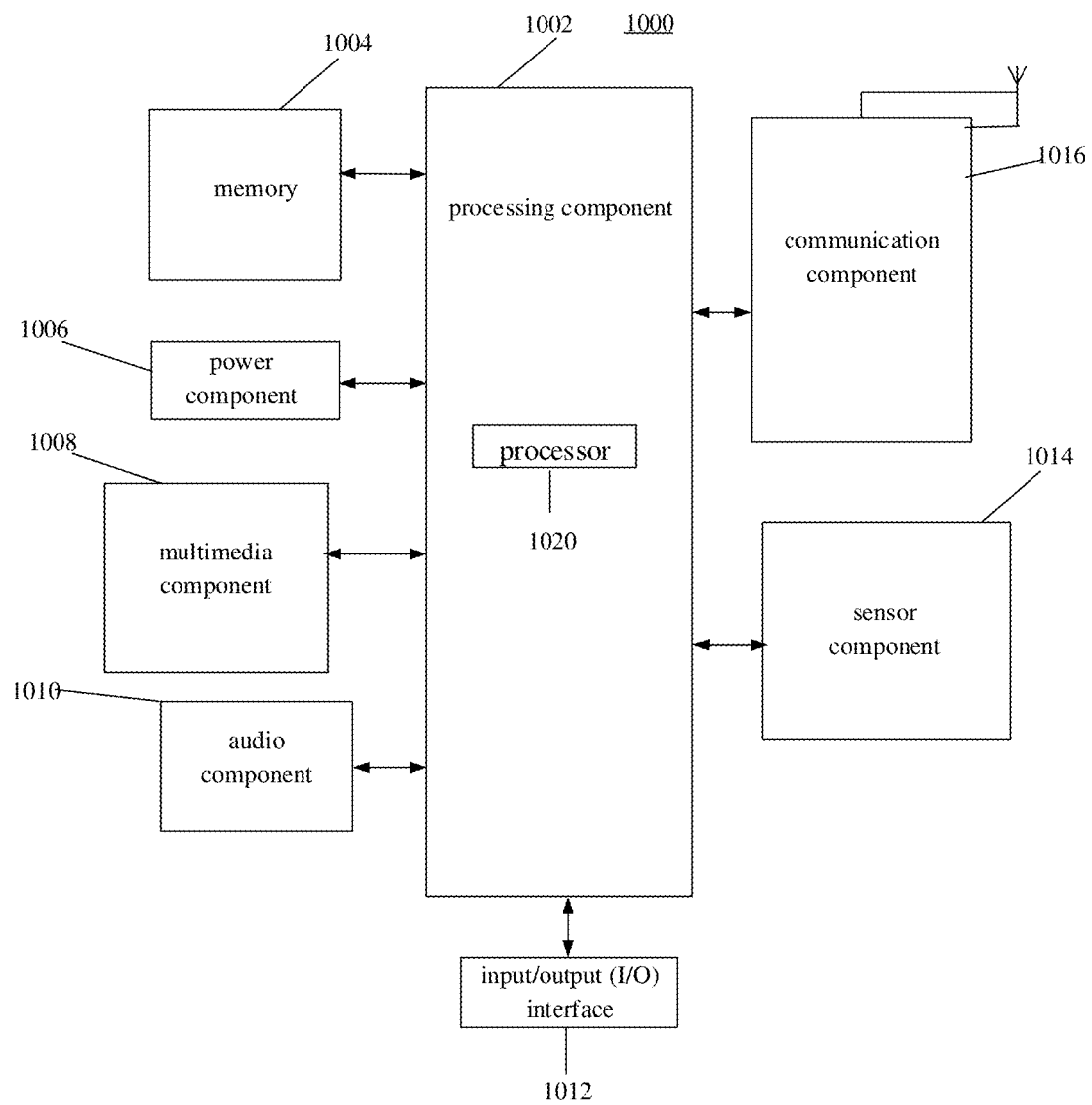
FIG. 10 is a block diagram of an electronic device according to an exemplary embodiment.

FIG. 10 is a block diagram of an electronic device 1000 according to an exemplary embodiment. For example, the device 1000 may be a mobile phone, a computer, a digital broadcast terminal, a messaging device, a game console, a tablet device, a medical device, an exercise device, a personal digital assistant, and so on.

Referring to FIG. 10, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 normally controls the overall operation (such as operations associated with displaying, telephone calls, data communications, camera operations and recording operations) of the device 1000. The processing component 1002 may include one or a plurality of processors 1020 to execute instructions so as to perform all or part of the steps of the above described method. In addition, the processing component 1002 may include one or a plurality of units to facilitate interactions between the processing component 1002 and other components. For example, the processing component 1002 may include a multimedia unit to facilitate interactions between the multimedia component 1008 and the processing component 1002. Also for example, the processing component 1002 may execute instructions to implement a touch drive module or an application processor.

The memory 1004 is configured to store various types of data to support operations at the device 1000. Examples of such data include instructions for any application or method operated on the device 1000, contact data, phone book data, messages, images, videos and the like. The memory 1004 may be realized by any type of volatile or non-volatile storage devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 1006 provides power to various components of the device 1000. The power component 1006 may include a power management system, one or a plurality of power sources and other components associated with power generation, management, and distribution of the device 1000.

The multimedia component 1008 includes a screen that provides an output interface between the device 1000 and the user. In some embodiments, the screen may include a liquid crystal display (LCD) and a touch panel (TP). If the screen includes a touch panel, the screen may be implemented as a touch screen to receive input signals from the user. The touch panel includes one or a plurality of touch sensors to sense touches, slides, and gestures on the touch panel. The touch sensor may sense not only the boundary of the touches or sliding actions, but also the duration and pressure related to the touches or sliding operations. In some embodiments, the multimedia component 1008 includes a front camera and/or a rear camera. When the device 1000 is in an operation mode such as a shooting mode or a video mode, the front camera and/or the rear camera may receive external multimedia data. Each front camera and rear camera may be a fixed optical lens system or have a focal length and an optical zoom capability.

The audio component 1010 is configured to output and/or input an audio signal. For example, the audio component 1010 includes a microphone (MIC) that is configured to receive an external audio signal when the device 1000 is in an operation mode such as a call mode, a recording mode, and a voice recognition mode. The received audio signal may be further stored in the memory 1004 or transmitted via the communication component 1016. In some embodiments, the audio component 1010 further includes a speaker for outputting audio signals.

The I/O interface 1012 provides an interface between the processing component 1002 and a peripheral interface unit. The peripheral interface unit may be a keyboard, a click wheel, a button and so on. These buttons may include, but are not limited to, a home button, a volume button, a start button, and a locking button.

The sensor assembly 1014 includes one or a plurality of sensors for providing the device 1000 with various aspects of status assessments. For example, the sensor component 1014 may detect an ON/OFF state of the device 1000 and a relative positioning of the components. For example, the components may be a display and a keypad of the device 1000. The sensor component 1014 may also detect a change in position of the device 1000 or a component of the device 1000, the presence or absence of contact of the user with the device 1000, the orientation or acceleration/deceleration of the device 1000 and a temperature change of the device 1000. The sensor component 1014 may include a proximity sensor configured to detect the presence of nearby objects without any physical contact. The sensor component 1014 may also include a light sensor (such as a CMOS or a CCD image sensor) for use in imaging applications. In some embodiments, the sensor component 1014 may further include an acceleration sensor, a gyro sensor, a magnetic sensor, a pressure sensor, or a temperature sensor.

The communication component 1016 is configured to facilitate wired or wireless communication between the device 1000 and other devices. The device 1000 may access a wireless network based on a communication standard such as Wi-Fi, 2G, 3G, 4G, or 5G, or a combination thereof. In some exemplary embodiments, the communication component 1016 receives broadcast signals or broadcast-associated information from an external broadcast management system via a broadcast channel In some exemplary embodiments, the communication component 1016 further includes a near field communication (NFC) module to facilitate short range communication. For example, the NFC module may be implemented based on radio frequency identification (RFID) technology, infrared data association (IrDA) technology, ultra-wideband (UWB) technology, Bluetooth (BT) technology and other technologies.

In some exemplary embodiments, the device 1000 may be implemented by one or a plurality of application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components, so as to perform the above touch control method.

In a sixth aspect, in some exemplary embodiments of the present disclosure, there is also provided a non-transitory computer readable storage medium including instructions, such as a memory 1004 including instructions. The instructions are executable by the processor 1020 of the device 1000 to perform the above method. For example, the non-transitory computer readable storage medium may be a ROM, a random access memory (RAM), a CD-ROM, a magnetic tape, a floppy disk, an optical data storage device, etc.

Other embodiments of the present disclosure will be apparent to those skilled in the art after considering the specification and practicing the present disclosure disclosed herein. The present disclosure is intended to cover any variations, uses or adaptive changes of the present disclosure, which are in accordance with general principles of the present disclosure and include common knowledge or technical means in the art that are not disclosed herein. The specification and embodiments are illustrative only, and the real scope and spirit of the present disclosure are indicated in the appended claims.

It should be understood that the present disclosure is not limited to the precise structures described above and illustrated in the drawings, and various modifications and changes may be made without departing from the scope thereof. The scope of the present disclosure is only limited by the appended claims.

What is claimed is:

1. A touch control method, applied to a touch drive module of a terminal device comprising an application processor, the method comprising:
    receiving a vertical synchronization signal;
    collecting position information corresponding to a touch operation;
    determining a reporting frequency of the position information based on the vertical synchronization signal, such that the position information is reported once in one signal interval, the signal interval being an interval between two adjacent vertical synchronization signals; and
    reporting the position information to the application processor based on the reporting frequency,
    wherein determining the reporting frequency of the position information based on the vertical synchronization signal comprises at least one of:
        determining at least two signal intervals based on the vertical synchronization signal, collecting at least two pieces of position information in the at least two signal intervals, each signal interval corresponding to at least one piece of position information, determining position information for reporting in each of the at least two signal intervals based on the at least two pieces of collected position information, and reporting the determined position information for reporting in each one of the at least two signal intervals such that the position information for reporting is reported once in one signal interval; or
        determining one signal interval based on the vertical synchronization signal, collecting at least one piece of position information in the one signal interval, determining position information for reporting in the one signal interval based on the at least one piece of collected position information, and reporting the determined position information for reporting in the one signal interval such that the position information for reporting is reported once in one signal interval.

2. The method of claim 1, wherein collecting the position information corresponding to the touch operation comprises:
    collecting the position information corresponding to the touch operation inputted by a user based on a preset frequency.

3. The method of claim 1, wherein determining the position information for reporting in the one signal interval based on the at least one piece of collected position information comprises:
    in response to collecting one piece of position information in the one signal interval, reporting the position information.

4. The method of claim 1, wherein determining the position information for reporting in the one signal interval based on the at least one piece of collected position information comprises:
    in response to collecting at least two pieces of position information in the one signal interval, reporting one of the at least two pieces of position information.

5. The method of claim 1, wherein determining the position information for reporting in the one signal interval based on the at least one piece of collected position information comprises:
    determining a new piece of position information based on at least two pieces of position information collected in the one signal interval for reporting.

6. The method of claim 5, wherein determining the new piece of position information based on the at least two pieces of position information collected in the one signal interval for reporting comprises:
    obtaining a preset reporting time line in the signal interval;
    determining a connection line based on the at least two pieces of position information in the one signal interval; and
    determining an intersection of the reporting time line and the connection line as the new piece of position information for reporting.

7. The method of claim 1, wherein determining the position information for reporting in each of the at least two signal intervals based on the at least two pieces of collected position information, comprises:
    obtaining a preset reporting time line in each of the at least two signal intervals;
    determining a connection line based on the at least two pieces of position information collected in the at least two signal intervals; and
    determining an intersection of the reporting time line in each of the at least two signal intervals and the connection line as position information for reporting in a corresponding signal interval.

8. A touch control method, applied to an application processor of a terminal device comprising a touch drive module, the method comprising:

sending a vertical synchronization signal to the touch drive module; and receiving position information reported by the touch drive module, wherein each piece of position information in the reported position information corresponds to one signal interval between two adjacent vertical synchronization signals, wherein the touch drive module reporting the position information by performing at least one of:

determining at least two signal intervals based on the vertical synchronization signal, collecting at least two pieces of position information in the at least two signal intervals, each signal interval corresponding to at least one piece of position information, determining position information for reporting in each of at least two signal intervals based on the at least two pieces of collected position information, and reporting the determined position information for reporting in each one the at least two signal intervals such that the position information for reporting is reported once in one signal interval; or determining one signal interval based on the vertical synchronization signal, collecting at least one piece of position information in the one signal interval, determining position information for reporting in the one signal interval based on the at least one piece of collected position information, and reporting the determined position information for reporting in the one signal interval such that the position information for reporting is reported once in one signal interval.

9. The method of claim 8, wherein the terminal device further comprises a display drive module, and sending the vertical synchronization signal to the touch drive module comprises:

sending the vertical synchronization signal to the display drive module that sends the vertical synchronization signal to the touch drive module.

10. The method of claim 8, further comprising:

determining visible position information based on the reported position information and the vertical synchronization signal, such that time intervals between pieces of visible position information and adjacent vertical synchronization signals are equal.

11. The method of claim 10, wherein determining the visible position information based on the reported position information and the vertical synchronization signal, comprises:

obtaining a visible time line in each signal interval;

determining a connection line based on reported position information in each signal interval; and determining an intersection of the visible time line in each signal interval and the connection line as the visible position information in a corresponding signal interval.

12. An electronic device, comprising:

a processor; and a memory storing instructions executable by the processor, wherein the processor is configured to:

receive a vertical synchronization signal;

collect position information corresponding to a touch operation;

determine a reporting frequency of the position information based on the vertical synchronization signal, such that the position information is reported once in one signal interval, the signal interval being an interval between two adjacent vertical synchronization signals; and report the position information based on the reporting frequency, wherein in determining the reporting frequency of the position information based on the vertical synchronization signal, the processor is further configured to perform at least one of:

determining at least two signal intervals based on the vertical synchronization signal, collecting at least two pieces of position information in the at least two signal intervals, each signal interval corresponding to at least one piece of position information, determining position information for reporting in each of at least two signal intervals based on the at least two pieces of collected position information, and reporting the determined position information for reporting in each one of the at least two signal intervals such that the position information for reporting is reported once in one signal interval; or determining one signal interval based on the vertical synchronization signal, collecting at least one piece of position information in the one signal interval, determining position information for reporting in the one signal interval based on the at least one piece of collected position information, and reporting the position information for reporting in the one signal interval such that the position information for reporting is reported once in one signal interval.

13. The electronic device of claim 12, wherein the processor is further configured to:

collect the position information corresponding to the touch operation inputted by a user based on a preset frequency.

14. The electronic device of claim 12, wherein in determining the position information for reporting in the one signal interval based on the at least one piece of collected position information, the processor is further configured to:

in response to collecting one piece of position information in the one signal interval, report the position information.

15. The electronic device of claim 12, wherein in determining the position information for reporting in the one signal interval based on the at least one piece of collected position information, the processor is further configured to:

in response to collecting at least two pieces of position information in the one signal interval, report one of the at least two pieces of position information.

16. The electronic device of claim 12, wherein in determining the position information for reporting in the one signal interval based on the at least one piece of collected position information, the processor is further configured to:

determine a new piece of position information based on at least two pieces of position information collected in the one signal interval for reporting.

17. The electronic device of claim 16, wherein in determining the new piece of position information based on the at least two pieces of position information collected in the one signal interval for reporting, the processor is further configured to:

obtain a preset reporting time line in the signal interval;

determine a connection line based on the at least two pieces of position information in the one signal interval; and determine an intersection of the reporting time line and the connection line as the new piece of position information for reporting.

18. The electronic device of claim 12, wherein in determining the position information for reporting in each of the at least two signal intervals based on the at least two pieces of collected position information, the processor is further configured to:
- obtain a preset reporting time line in each of the at least two signal intervals;
- determine a connection line based on the at least two pieces of position information collected in the at least two signal intervals; and
- determine an intersection of the reporting time line in each of the at least two signal intervals and the connection line as position information for reporting in a corresponding signal interval.

* * * * *